DRIVING DEVICE FOR A TAPE OR THE LIKE

Filed March 20, 1963

INVENTOR.
NOBUTOSHI KIHARA
BY
Ward, Neal, Haselton, Orme & McElhannon
ATTORNEYS

United States Patent Office 3,219,246
Patented Nov. 23, 1965

3,219,246

DRIVING DEVICE FOR A TAPE OR THE LIKE

Nobutoshi Kihara, Tokyo, Japan, assignor to Sony Corporation, Tokyo, Japan, a corporation of Japan Filed Mar. 20, 1963, Ser. No. 266,558
Claims priority, application Japan, Apr. 4, 1962, 37/13,461
4 Claims. (Cl. 226—181)

This invention relates to a device for driving a tape or the like, and, more particularly, to such a device wherein a capstan is employed along with two pinch or pressure rollers to drive the tape in a closed loop, for example, while applying a predetermined tension to the tape.

Heretofore, as far as I am aware, tape driving devices have necessarily employed accessory mechanisms, such as spring loaded means, for example, to apply a desired tension to the tape during driving. Accordingly, I contribute by my invention a tape driving device by which I am able to drive the tape while applying to it the desired tension without the need for any such accessory devices as aforementioned.

Thus, the present invention contemplates the provision of a driving device of the class described comprising a capstan having parts of different diameters, and two pressure or pinch rollers cooperating with the capstan, one pinch roller for supplying the tape being arranged to press the tape against the capstan part of smaller diameter, and the other roller for taking up the tape being arranged also to press the tape against the capstan part of smaller diameter but also contacting the capstan part of larger diameter. The two capstan parts are coaxial and the different in diameter of these parts is preferably selected to be twice as large as the thickness of the tape to be driven. Thus, the tape passes between the first roller and capstan at the circumferential speed of the capstan part of smaller diameter; but because the second roller contacts and receives driving power from the capstan part of larger diameter, it takes up the tape at the peripheral velocity of the capstan part of larger diameter, and a desired tension is thereby applied to the tape. It will be appreciated of course, that the two lengths of tape forming the closed loop may be opposite one another or they may be offset or staggered relatively to one another.

In practice, the tape will usually form a closed loop, as stated, passing first between one roller and the capstan, and then to any desired device, and finally back between the capstan and the second roller. For example, the tape may be magnetic tape for use in a video tape recorder and the device of the present invention may supply the tape to and take it up from a rotary magnetic head.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based, may readily be utilized as a basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein.

Figure 1:
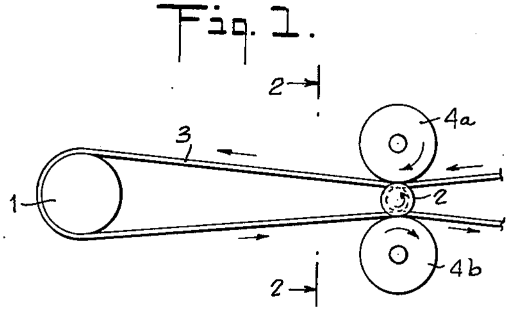
FIG. 1 is a schematic diagram illustrating an example of a driving device according to the present invention.
Figure 2:
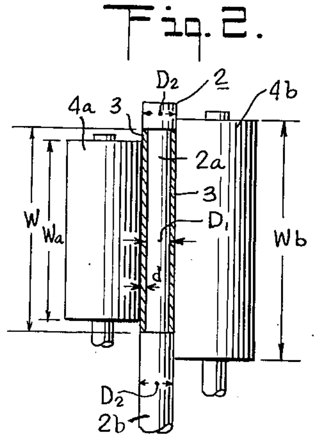
FIG. 2 is a cross sectional view taken along the line 2—2 of FIG. 1.

Referring now to the drawings, and more particularly to FIGS. 1 and 2 thereof, there is shown a driving device according to the present invention wherein a rotary magnetic head assembly 1, for example, is supplied by a capstan 2 with a magnetic recording tape 3. The tape 3 is trained around the magnetic head assembly 1 and passes between the capstan 2 and a pinch or pressure roller **4*a* on its way to the magnetic head assembly as indicated by the arrow, and is then taken up by passing between the capstan 2 and a second pinch or pressure roller 4*b*, thus forming a closed loop. Actually, the rollers 4*a* and 4*b* press the tape 3 against opposite sides of the capstan 2**.

As is best shown in FIG. 2, the capstan 2 is formed of at least two portions **2*a* and 2*b* of different diameters, D1 and D2 respectively; the larger diameter D2 equalling the smaller diameter D1 plus twice the thickness of the tape 3. The axial length of the capstan part 2*a* is at least equal to, or larger than the width W of the tape 3; and the part 2*a* of the capstan 2 may be positioned between two end parts 2*b* having the larger diameter D2. It will be noted that the roller 4*a* presses the portion of the tape being supplied to the magnetic head assembly against the portion 2*a* of the capstan 2 of smaller diameter, while the roller 4*b* presses the portion of the tape being taken up from the magnetic head assembly against the opposite side of the portion 2*a* of the capstan 2**, but the axial length W*b* of this roller is greater than the width W of the tape and overextends the portion of smaller diameter so as to contact the portions **2*b* of the capstan 2** of larger diameter.

Figure 3:
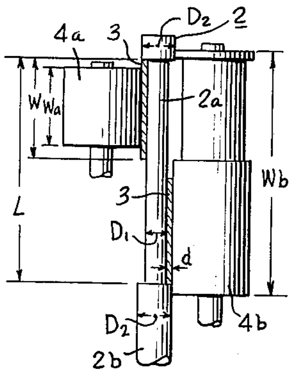
FIG. 3 is a view similar to FIG. 2 but illustrating another form of the present invention.

Referring now to FIG. 3, there is shown another embodiment of the invention wherein the capstan part **2*a* of smaller diameter is longer axially than the width W of the tape 3, but this capstan is otherwise formed in the same manner as the capstan illustrated in FIG. 2. In this embodiment, the legs of the tape 3 forming the loop are offset or staggered vertically, as shown, relatively to one another and the supply leg of the loop is again pressed against the portion 2*a* of the capstan by the roller 4*a*** which has an axial length W*a* somewhat less than the width W of the tape. The return or takeup leg of the loop is pressed against the opposite side of the capstan portion **2*a* by the roller 4*b* which again contacts the portion 2*b* of the capstan 2 of larger diameter. In this embodiment, the roller 4*b* has an upwardly extending part of reduced diameter at the top of which is formed a further part of a diameter 4*b* which engages the upper enlarged part of the capstan 2**.

Figure 4:
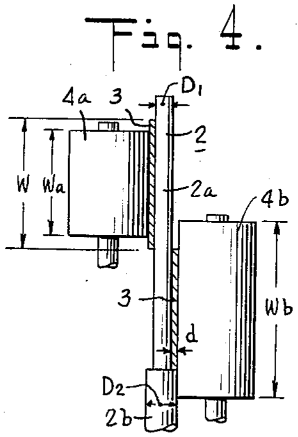
FIG. 4 illustrates a further form of the invention.

FIG. 4 illustrates still a further embodiment of the invention and is quite similar to the construction described in connection with FIG. 3, but in this embodiment the roller **4*b* is formed without the upper extension of reduced diameter or the upper enlarged part and the capstan 2 is formed without the upper part 2*a* of enlarged diameter so that only the lower part of the roller 4*b*, as viewed, contacts the enlarged part 2*b* of the capstan 2**.

From the description thus far, and with particular reference to FIGS. 2 to 4, it will be appreciated that the length W*a* of the roller **4*a* supplying the tape to the magnetic head assembly 1, is selected to be equal to or smaller than the width W of the tape 3, and this roller 4*a* presses the tape 3 against one side of the capstan part 2*a* without actually being itself in direct contact with any part of the capstan 2. The roller 4*b* for taking up the tape is so arranged as to press the tape onto the capstan part 2***a* of smaller diameter from the opposite side, but this roller also contacts the capstan part 2*b* of larger diameter D2. Therefore, the axial length W*b* of the roller 4*b* is usually larger than the width W of the tape 3.

In the embodiment illustrated in FIG. 2, the leg of the tape being supplied to the magnetic head assembly 1 and that being taken up, as viewed, are opposite one another, while in FIGS. 3 and 4, these parts are staggered vertically relatively to one another.

Figure 5:
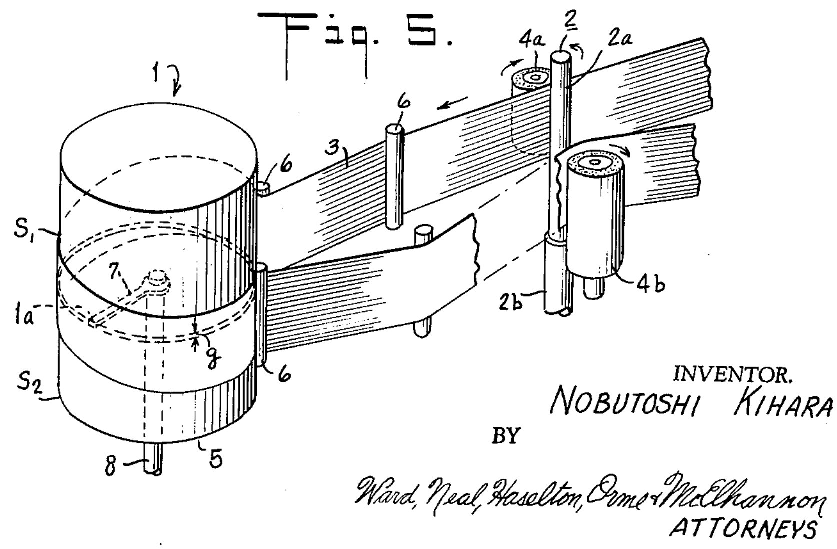
FIG. 5 is a perspective view illustrating an example of the invention in which the tape is supplied to and taken up from a magnetic video tape recording device.

Referring now to FIG. 5, there is illustrated a complete tape supply and takeup assembly as it may well be used in connection with a magnetic head assembly. The magnetic head assembly 1 may be provided with a rotary magnetic head 1*a* on an arm 7 mounted on a rotating shaft 8. The magnetic tape is guided by a guide face 5 which may be composed of two coaxial cylinders S1 and S2 arranged adjacent each other so as to form a ring gap *g* therebetween. The magnetic head 1*a* rotates in the gap *g*, as illustrated. In this case, the magnetic tape 3 travels obliquely around the guide face 5 and is in contact with the magnetic head 1*a* wherefore magnetic tracks are formed in the tape in oblique relation to the longitudinal or travelling direction of the tape. Desirably, the tape may be guided to and from the magnetic head assembly by guide members 6. Video signals may be recorded on this track for subsequent play-back.

According to the construction illustrated in FIG. 5, the magnetic tape 3 is pressed against the capstan 2 by roller 4*a* in the supply side so that the tape is driven by the capstan part 2*a* of diameter D1. On the other hand, the tape 3 is taken up from the magnetic head assembly 1 by a torque transmitted to the pinch roller 4*b* from the capstan part 2*b* of larger diameter D2. That is, the magnetic tape is supplied to and taken up from the magnetic head assembly 1 by the same capstan 2; but is supplied to the head at the circumferential speed of the capstan part 2*a* and is taken up from the head at the circumferential speed of the capstan part 2*b*. As a result, a tension is produced in the loop of the tape running around the magnetic head assembly 1 due to the difference in the circumferential speeds of the capstan parts 2*a* and 2*b*.

While the present invention has been described in terms of a magnetic video tape supplied to and taken up from a magnetic head assembly, it will be appreciated that this invention may very well be applied for the driving of other tapes for other purposes.

From the foregoing description it will be appreciated that I have contributed a tape driving device capable of driving a tape under stable conditions and under a predetermined tension without the necessity of supplying additional accessory tension devices.

I believe that the construction and operation of my novel tape driving device will now be understood, and that the advantages thereof will be fully appreciated by those persons skilled in the art.

I now claim:

1. A driving device for a tape comprising a capstan formed with two axially adjacent portions of different diameters, the smaller diameter portion having a length of at least as great as the width of said tape, the smaller diameter differing from the larger diameter by substantially twice the thickness of said tape, a first pinch roller for supplying said tape, said first pinch roller being arranged to press said tape to one side of the smaller diameter portion of said capstan, a second pinch roller for taking up said tape, said second pinch roller being of constant diameter and of similar material throughout its effective length and arranged so that a portion of its effective length contacts the larger diameter portion of said capstan, while another portion of its effective length presses said tape against the opposite side of said smaller diameter portion of said capstan whereby said pinch roller effectively imparts to said tape a degree of tension suitable for magnetic recording and playback without causing slippage of said tape on either side of said capstan.

2. Apparatus as in claim 1 wherein said capstan has a further larger diameter portion axially adjacent the opposite end of said smaller diameter portion and of equal diameter with said first mentioned larger diameter portion, and wherein said second pinch roller contacts both said larger diameter portions.

3. Apparatus as in claim 1 wherein said smaller diameter portion of said capstan is of a length at least twice as great as the width of said tape, wherein said first and second pinch rollers are staggered on opposite sides of said capstan to effect driving of tape at different heights, coming and going, respectively, along the smaller diameter portion of said capstan.

4. Apparatus as in claim 3 further including a cylindrical guide and guide rollers for guiding said tape to extend helically above the outer circumference of said cylindrical guide, and to extend back from said cylindrical guide and across opposite sides of the smaller diameter portion of said capstan at said different heights.

References Cited by the Examiner

UNITED STATES PATENTS

| | | | |
|---|---|---|---|
| 2,913,192 | 11/1959 | Mullin | 226—186 X |
| 3,099,376 | 7/1963 | Kennedy | 226—181 X |
| 3,123,271 | 3/1964 | Johnson | 226—186 |

FOREIGN PATENTS

| | | |
|---|---|---|
| 615,382 | 2/1961 | Canada. |

M. HENSON WOOD, Jr., *Primary Examiner.*

ANDRES H. NIELSEN, SAMUEL F. COLEMAN, *Examiners.*